(12) United States Patent
Wang et al.

(10) Patent No.: US 9,213,197 B2
(45) Date of Patent: Dec. 15, 2015

(54) COLOR FILTER SUBSTRATE, LIQUID CRYSTAL PANEL AND LIQUID CRYSTAL DISPLAY

(75) Inventors: Qiangtao Wang, Beijing (CN); Wenbing Li, Beijing (CN); Xinli Ma, Beijing (CN); Yan Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 322 days.

(21) Appl. No.: 13/703,719

(22) PCT Filed: Jul. 13, 2012

(86) PCT No.: PCT/CN2012/078623
§ 371 (c)(1),
(2), (4) Date: Dec. 12, 2012

(87) PCT Pub. No.: WO2013/010457
PCT Pub. Date: Jan. 24, 2013

(65) Prior Publication Data
US 2013/0120697 A1    May 16, 2013

(30) Foreign Application Priority Data
Jul. 15, 2011    (CN) .......................... 2011 1 0199767

(51) Int. Cl.
*G02F 1/1335*    (2006.01)
*G02B 5/20*    (2006.01)
(52) U.S. Cl.
CPC .......... *G02F 1/133514* (2013.01); *G02B 5/201* (2013.01); *G02B 2207/113* (2013.01); *G02F 2201/52* (2013.01)

(58) Field of Classification Search
USPC .................................................. 349/106, 108
See application file for complete search history.

(56) References Cited

U.S. PATENT DOCUMENTS

| | | | |
|---|---|---|---|
| 2005/0117092 | A1 | 6/2005 | Park et al. |
| 2005/0225574 | A1 | 10/2005 | Brown Elliott et al. |
| 2005/0225575 | A1 | 10/2005 | Brown Elliott et al. |
| 2005/0285996 | A1 | 12/2005 | Nakamura et al. |
| 2007/0008462 | A1 | 1/2007 | Yang et al. |
| 2009/0207328 | A1* | 8/2009 | Hur et al. ........................ 349/37 |

FOREIGN PATENT DOCUMENTS

| | | |
|---|---|---|
| CN | 1621917 A | 6/2005 |
| CN | 1722193 A | 1/2006 |
| CN | 1892263 A | 1/2007 |
| CN | 1977212 A | 6/2007 |
| CN | 102162950 A | 8/2011 |

(Continued)

OTHER PUBLICATIONS

International Search Report; mailed Jan. 11, 2012; PCT/CN2012/078623.
Second Chinese Office Action dated Mar. 24, 2014; Appln. No. 201110199767.8.

(Continued)

*Primary Examiner* — Lucy Chien
(74) *Attorney, Agent, or Firm* — Ladas & Parry LLP (57) ABSTRACT

Embodiments of the present invention provide a color filter substrate, a liquid crystal panel and a liquid crystal display. The color filter substrate comprises a plurality of elementary pixels. Each of the elementary pixels comprises sub-pixels in four colors. Among the sub-pixels in four colors, a sub-pixel in at least one of the colors has a number larger than or equal to 2.

20 Claims, 5 Drawing Sheets

(56) References Cited

FOREIGN PATENT DOCUMENTS

| CN | 202041673 A | 11/2011 |
|----|-------------|---------|
| JP | 2000-029015 A | 1/2000 |
| JP | 2007-094337 A | 4/2007 |
| JP | 2007-279097 A | 10/2007 |

OTHER PUBLICATIONS

First Chinese Office Action dated Jul. 12, 2013; Appln. No. 201110199767.8.

International Report on Patentability Issued Jan. 21, 2014; Appln. No. PCT/CN2012/078623.

* cited by examiner

COLOR FILTER SUBSTRATE, LIQUID CRYSTAL PANEL AND LIQUID CRYSTAL DISPLAY

TECHNICAL FIELD

Embodiments of the present invention relate to a color filter substrate, a liquid crystal panel and a liquid crystal display.

BACKGROUND

With the development and progress of Thin Film Transistor Liquid Crystal Display (TFT-LCD), production cost of liquid crystal display is gradually decreased and manufacturing process thereof is increasingly improved, so that liquid crystal display has become the dominant technology in the display field.

A liquid crystal display (LCD) mainly comprises a thin film transistor array substrate and a color filter substrate bonded with each other and a liquid crystal layer sandwiched between the thin film transistor array substrate and the color filter substrate. For example, the thin film transistor array substrate comprises: a glass substrate, a gate line, a data line, a thin film field effect transistor, a pixel electrode, an insulating protection layer, etc. In the thin film transistor array substrate, each elementary pixel typically comprises three sub-pixels (for example, RGB sub-pixels), and each of the sub-pixels is coordinately controlled by a corresponding gate line and a corresponding data line which are connected to it. Each of the sub-pixels has a corresponding sub-pixel electrode.

For example, the color filter substrate comprises: a glass substrate, a black matrix, a common electrode, a color filter layer, a transparent resin protection layer and a columnar spacer faulted on the black matrix. In the color filter substrate, each pixel (also referred to as an elementary pixel) typically comprises three sub-pixels (for example, RGB sub-pixels). The RGB sub-pixels in the color filter substrate and the RGB sub-pixel electrodes in the array substrate correspond to each other in position and shape.

The color filter substrate provides colors for display. Specifically, the color filter substrate employs the sub-pixels of different colors to allow lights of different colors to pass through and controls the intensity of light passing through the sub-pixels of different colors, so that colors required by the user are displayed.

Color gamut refers to a ratio of an area between color coordinates of the sub-pixel to an area between color coordinates regulated by (USA) National Television Standards Committee (NTSC) standard. Normal liquid crystal display has a color gamut of 70% or so, that is, it can display about 70% of colors in a NTSC chromaticity diagram. If the liquid crystal display has the color gamut of higher than 90%, it is called as a display of wide color gamut, and herein, the description are given with respect to the liquid crystal display having the color gamut of 70% or so. In the case that the liquid crystal display has the color gamut of 70% or so, many initial colors may not be displayed or may be lost during display, so it is necessary to wide the color gamut so as to achieve a better color reproduction. It is possible that a display with wide color gamut is achieved by employing sub-pixels of multiple colors (more than three colors). For example, four sub-pixels which have same areas but take on different colors are used to constitute an elementary pixel, and then a better color reproduction effect can be realized. However, in this case, although the color gamut has been widened, the resolution of the display is not increased on the premise that the pixel area is the same.

As can be seen, the conventional liquid crystal display suffers from a problem that a relatively high resolution may not be maintained while a high color gamut is provided.

SUMMARY

According to an embodiment of the present invention, there is provided a color filter substrate. The color filter substrate comprises a plurality of elementary pixels. Each of the elementary pixels comprises sub-pixels in four colors. Among the sub-pixels in four colors, a sub-pixel in at least one of the colors has a number larger than or equal to 2.

According to another embodiment of the present invention, there is provided a liquid crystal panel. The liquid crystal panel comprises the color filter substrate as stated above.

According to still another embodiment of the present invention, there is provided a liquid crystal display. The liquid crystal display comprises the liquid crystal panel as stated above.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

According to a first embodiment of the invention, a color filter substrate is provided. In the color filter substrate, each elementary pixel (also referred to as "pixel") comprises sub-pixels in four colors, and among the sub-pixels in four colors, a sub-pixel in at least one of the colors has a number larger than or equal to 2. As such, it can be ensured that there are at least five sub-pixels in each elementary pixel, and therefore, the resolution can be enhanced compared with the conventional technology in which each elementary pixel consists of four sub-pixels which have same areas but take on different colors. Herein, "elementary pixel" acts to implement one basic color pixel point constituting a picture during display, and the color shown by the pixel point is obtained by mixing lights from respective sub-pixels of the elementary pixel. Switches for sub-pixels which constitute the elementary pixel are collectively controlled.

For example, in order to reduce process complexity, another sub-pixel in at least one of the colors has a number equal to 1.

For example, in each elementary pixel, the sub-pixels are arranged in a line.

For example, the above sub-pixels in four colors comprise sub-pixels in three primary colors of R, G, and B and a sub-pixel in other color. For example, the sub-pixel in other color is a yellow sub-pixel, a pink sub-pixel or a cyan sub-pixel. Preferably, the sub-pixel in other color is a yellow sub-pixel. By means of using the yellow sub-pixel, transmittance of color filter layer can be increased. Because the yellow sub-pixel has a higher transmittance than red, green or blue sub-pixel, the overall transmittance of the color filter layer can be increased.

For example, the sub-pixel having the number larger than or equal to 2 is a green sub-pixel, and this is for the reason that, in the case where actual resolutions are the same, human eyes are more sensitive to the green and thus person will feel a higher resolution.

It needs to be noted that, the elementary pixel in the color filter substrate according to the first embodiment of the invention and the elementary pixel composed of four sub-pixels which have same areas but take on different colors in the conventional technology have the same area. Therefore, when the sub-pixel in at least one of the colors has a number larger than or equal to 2 in the first embodiment according to the invention, the area of the sub-pixel in at least one of the colors will be smaller than or equal to half of the area of the sub-pixel in the conventional technology.

Figure 1:
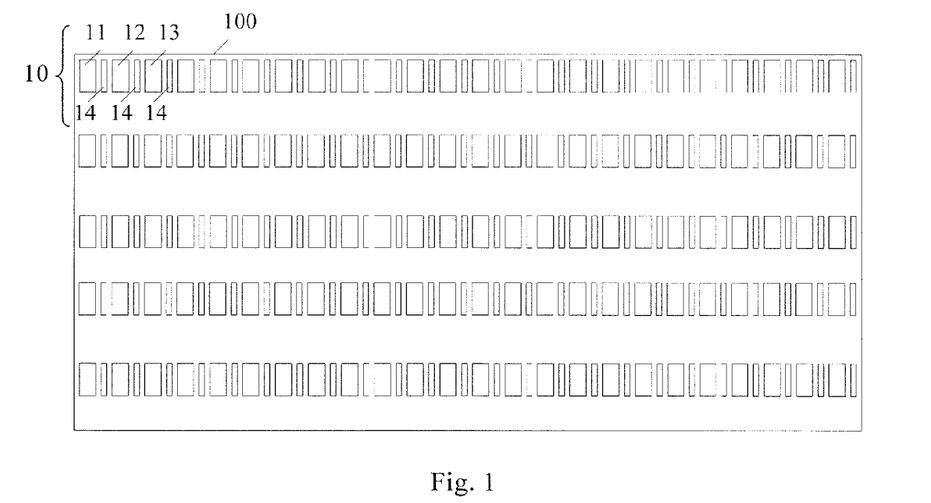
FIG. 1 is a schematic view illustrating a color filter substrate according to a first embodiment of the invention, in which one elementary pixel has six sub-pixels.

Details of the first embodiment of the invention will be described below in combination with FIG. 1. FIG. 1 is a schematic view illustrating the color filter substrate according to the first embodiment of the invention. In the color filter substrate 100, each elementary pixel 10 has six sub-pixels. As shown in FIG. 1, each elementary pixel 10 of the color filter substrate 100 comprises one first-color sub-pixel 11 such as a red sub-pixel, one second-color sub-pixel 12 such as a blue sub-pixel, one third-color sub-pixel 13 such as a yellow sub-pixel, and three fourth-color sub-pixels 14 such as green sub-pixels. The first-color sub-pixel 11, the second-color sub-pixel 12 and the third-color sub-pixel 13 have the same area. The area of each of the fourth-color sub-pixels 14 is equal to one third of the area of the sub-pixel in other color 11, 12 and 13. Of course, colors of the first-color sub-pixel 11, the second-color sub-pixel 12, the third-color sub-pixel 13 and the fourth-color sub-pixels are not limited to the above exemplary colors. In addition, it needs to be particularly noted that, the color of the fourth-color sub-pixels is not limited in the embodiment of the invention.

In the color filter substrate 100 according to the first embodiment of the invention, since the fourth-color sub-pixels has a smaller area, the color filter substrate 100 can be made to have a higher resolution on the basis of possessing a higher color gamut.

As shown in FIG. 1, the sub-pixels of the elementary pixel 10 are arranged in a line. The number of the first-color sub-pixel 11 is one. The number of the second-color sub-pixel 12 is one. The number of the third-color sub-pixel 13 is one. The number of the fourth-color sub-pixels is three. The area of each of the fourth-color sub-pixels 14 is equal to one third of the area of the sub-pixel in other color 11, 12 and 13. For example, the first-color sub-pixel 11 is a red sub-pixel, the second-color sub-pixel 12 is a blue sub-pixel, the third-color sub-pixel 13 is a yellow sub-pixel and the fourth-color sub-pixels 14 are green sub-pixels. In this case, in each pixel row, the elementary pixel composed of "red sub-pixel, green sub-pixel, blue sub-pixel, green sub-pixel, yellow sub-pixel, green sub-pixel . . . (namely, RGBGYG . . . )" is periodically arranged.

Further, in terms of different pixel rows, for example, the elementary pixel composed of red sub-pixel, green sub-pixel, blue sub-pixel, green sub-pixel, yellow sub-pixel, green sub-pixel . . . is periodically arranged in a first pixel row, the elementary pixel composed of blue sub-pixel, green sub-pixel, yellow sub-pixel, green sub-pixel, red sub-pixel, green sub-pixel . . . is periodically arranged in a second pixel row, the elementary pixel composed of yellow sub-pixel, green sub-pixel, red sub-pixel, green sub-pixel, blue sub-pixel, green sub-pixel . . . is periodically arranged in a third pixel row, and the sub-pixels of the elementary pixel of subsequent pixel rows are arranged in the way as described above. That is, except for the first row, the arranging order of the sub-pixels of the elementary pixel of each pixel row is that, a right shift by one sub-pixel having a larger area and one sub-pixel having a smaller area is made on the basis of a previous pixel row. The arranging order of the sub-pixels of the elementary pixel of the first pixel row is that, a left shift by one sub-pixel having a larger area and one sub-pixel having a smaller area is made on the basis of the second pixel row.

In addition, it may also be the case that, the elementary pixel composed of red sub-pixel, green sub-pixel, blue sub-pixel, green sub-pixel, yellow sub-pixel, green sub-pixel . . . is periodically arranged in a first pixel row, the elementary pixel composed of yellow sub-pixel, green sub-pixel, red sub-pixel, green sub-pixel, blue sub-pixel, green sub-pixel . . . is periodically arranged in a second pixel row, the elementary pixel composed of blue sub-pixel, green sub-pixel, yellow sub-pixel, green sub-pixel, red sub-pixel, green sub-pixel . . . is periodically arranged in a third pixel row, and the sub-pixels of the elementary pixel of subsequent pixel rows are arranged in the way as described above. That is, except for the first row, the arranging order of the sub-pixels of the elementary pixel of each pixel row is that, a left shift by one sub-pixel having a larger area and one sub-pixel having a smaller area is made on the basis of a previous pixel row. The arranging order of the sub-pixels of the elementary pixel of the first pixel row is that, a right shift by one sub-pixel having a larger area and one sub-pixel having a smaller area is made on the basis of the second pixel row.

Figure 2:
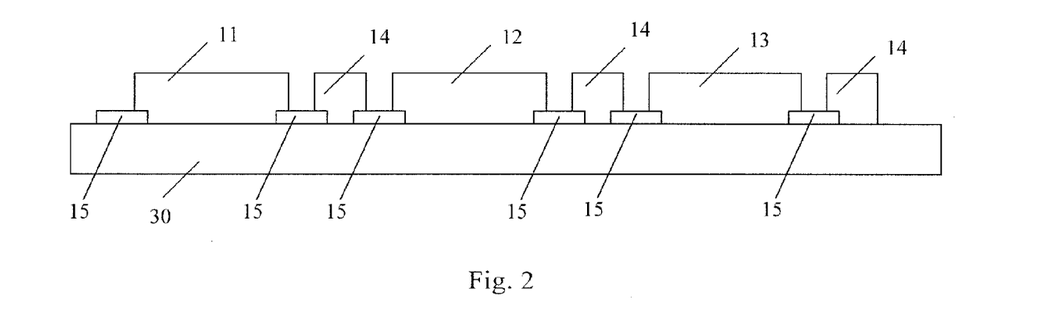
FIG. 2 is a cross-sectional view illustrating the color filter substrate according to the first embodiment of the invention, in which one elementary pixel has six sub-pixels.

FIG. 2 is a cross-sectional view showing the above color filter substrate. As shown in FIG. 2, a glass substrate 30 has a black matrix BM 15, the first-color sub-pixel 11, the second-color sub-pixel 12, the third-color sub-pixel 13 and the fourth-color sub-pixels 14 deposited thereon.

Figure 3:
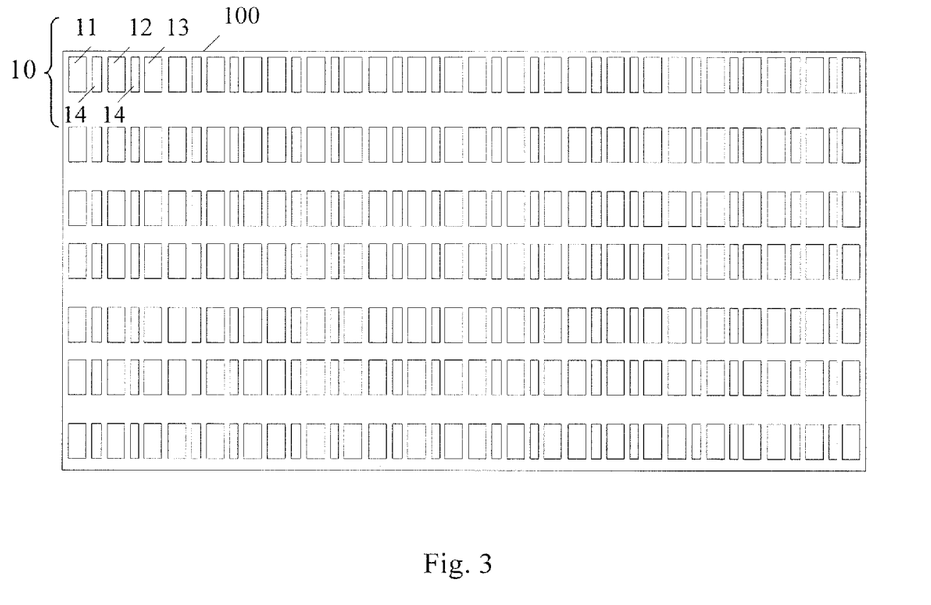
FIG. 3 is a schematic view illustrating another color filter substrate according to the first embodiment of the invention, in which one elementary pixel has five sub-pixels.

FIG. 3 is a schematic view illustrating another color filter substrate according to the first embodiment of the invention. In this color filter substrate, each elementary pixel 10 has five sub-pixels. As shown in FIG. 3, each elementary pixel 10 of the color filter substrate comprises one first-color sub-pixel 11 such as a red sub-pixel, one second-color sub-pixel 12 such as a blue sub-pixel, one third-color sub-pixel 13 such as a yellow sub-pixel, and two fourth-color sub-pixels 14 such as green sub-pixels. The area of each of the fourth-color sub-pixel 14 is equal to half of the area of the sub-pixel in other color 11, 12 and 13. In each pixel row, the elementary pixel composed of red sub-pixel, green sub-pixel, blue sub-pixel, green sub-pixel, yellow sub-pixel . . . is periodically arranged.

Regarding the color filter substrates shown in FIG. 1 and FIG. 3, colors of the first-color sub-pixel 11, the second-color sub-pixel 12, the third-color sub-pixel 13 and the fourth-color sub-pixels are not limited to the above exemplary colors. For example, the third-color sub-pixel 13 may be a cyan sub-pixel. In this case, the elementary pixel composed of red sub-pixel, green sub-pixel, blue sub-pixel, green sub-pixel, cyan sub-pixel, green sub-pixel . . . is periodically arranged in each pixel row, or the elementary pixel composed of red sub-pixel, green sub-pixel, blue sub-pixel, green sub-pixel, cyan sub-pixel . . . is periodically arranged in each pixel row.

Figure 4:
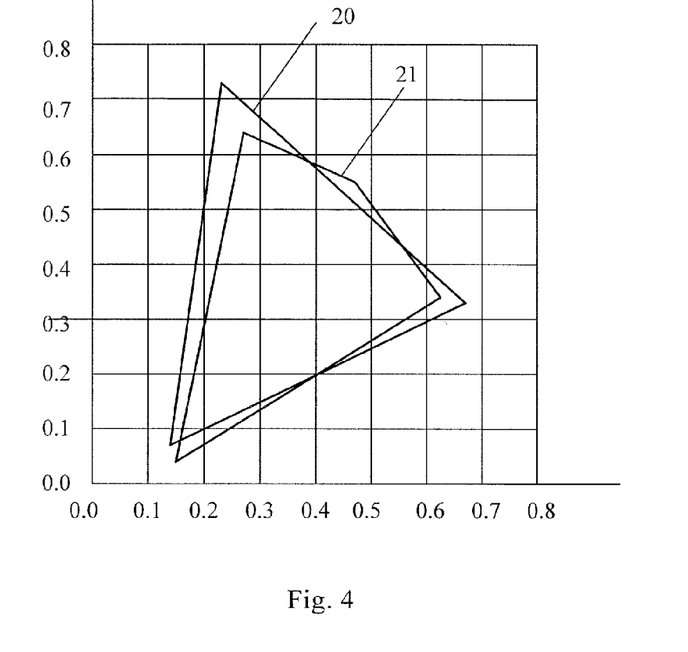
FIG. 4 is a graph illustrating the color gamut of the color filter substrate having sub-pixels in four colors according to the first embodiment of the invention in the case that a LED backlight is employed.
Figure 5:
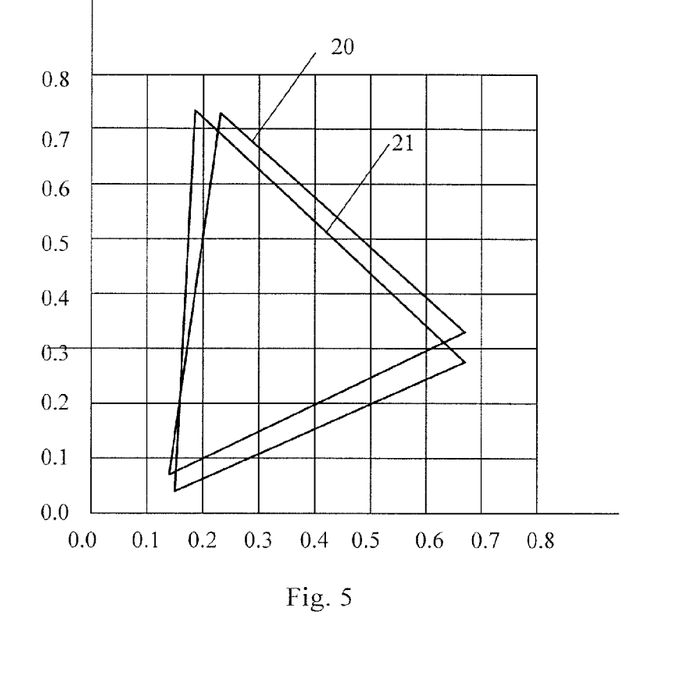
FIG. 5 is a graph illustrating the color gamut of the color filter substrate having sub-pixels in four colors according to the first embodiment of the invention in the case that a CCFL backlight is employed.

For the color filter substrate according to the first embodiment of the invention, if a light-emitting-diode (LED) backlight source matching it is used, then as shown in FIG. 4, the range of its color gamut 21 can reach 100% or higher of the color gamut 20 regulated by NTSC, and if a wide-color-gamut cold-cathode-fluorescent-light (CCFL) backlight source is used, then as shown in FIG. 5, the range of its color gamut 22 is higher than 70% of the color gamut 20 regulated by NTSC. In addition to three primary colors of red, green and blue, contribution to the increasing of color gamut which is made by the fourth color depends on the color coordinates of the fourth color, and yellow, cyan and pink are relatively effective for the fourth color. It should be noted that, color gamut can not be increased by white.

Resolution is represented by the number of pixels presented in each inch (pixels per inch). In the color filter substrate according to the embodiment of the invention, the number of the fourth-color sub-pixels is three and the area of each of the fourth-color sub-pixels is equal to one third of the area of the sub-pixel in other color. In this case, the resolution can be raised by 50% compared with the conventional technology in which the elementary pixel is composed of four sub-pixels having the same area.

Figure 6:
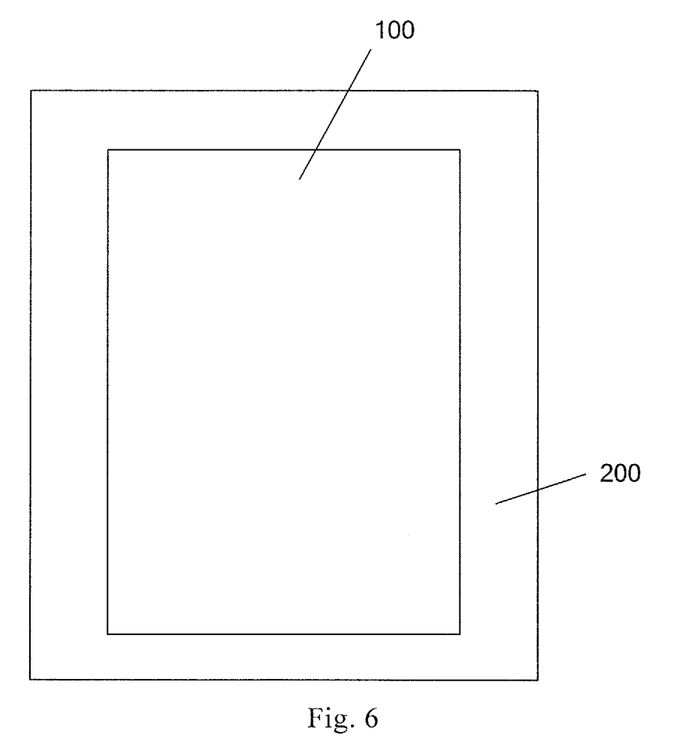
FIG. 6 is a structurally schematic view illustrating a liquid crystal panel according a second embodiment of the invention.

A second embodiment of the invention provides a liquid crystal panel 200. As shown in FIG. 6, the liquid crystal panel 200 comprises the color filter substrate 100 as stated above. The liquid crystal panel 200 further comprises an array substrate (not shown) which is disposed opposite to the color filter substrate 100 so as to form a liquid crystal cell. The array substrate comprises elementary pixels which correspond to the elementary pixels of the color filter substrate, and sub-pixels which correspond to the sub-pixels of the color filter substrate. Each elementary pixel of the array substrate is defined by a corresponding gate line and a corresponding data line. Switches of respective sub-pixels in each elementary pixel are collectively controlled by the gate line, light intensity for each of the sub-pixels is controlled by a data signal applied to the corresponding data line, and thus a basic image point is implemented upon display.

Figure 7:
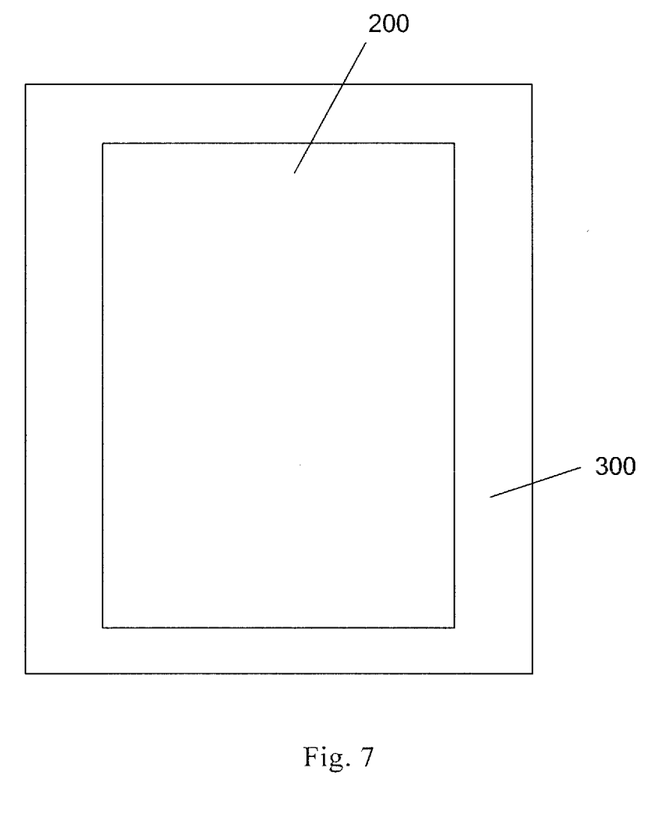
FIG. 7 is a structurally schematic view illustrating a liquid crystal display according a third embodiment of the invention.

A third embodiment of the invention provides a liquid crystal display. As shown in FIG. 7, the liquid crystal display 300 comprises the liquid crystal panel 200 as stated above. The liquid crystal display can further comprise a backlight (not shown). The backlight is disposed behind the liquid crystal panel 200 so as to provide light source for display of the liquid crystal panel 200.

The forgoing embodiments are merely used to explain technical solutions of the invention, rather than set a limit on it. Although the invention has been described in detail with reference to preferred embodiments, it should be appreciated by those ordinarily skilled in the are that, modifications or equivalent replacements can still be made by them with respect to the technical solutions of the invention, and these modifications or equivalent replacements may not make the modified technical solutions depart from the spirit and scope of the technical solutions of the invention, either.

What is claimed is:

1. A color filter substrate comprising a plurality of elementary pixels, wherein
    each of the elementary pixels comprises sub-pixels in four colors;
    among the sub-pixels in four colors, a sub-pixel in at least one of the colors has a number larger than or equal to 2;
    in each pixel row, the elementary pixel, which is composed of the first-color sub-pixel, one of the fourth-color sub-pixels, the second-color sub-pixel, one of the fourth-color sub-pixels, the third-color sub-pixel and one of the four-color sub-pixels, is periodically arranged; and
    except for a first pixel row, the arranging order of the sub-pixels of each elementary pixel of each pixel row is that, a right shift by one of the sub-pixels which has a larger area and one of the sub-pixels which has a smaller area is made on the basis of a previous row, and the arranging order of the sub-pixels of each elementary pixel of the first pixel row is that, a left shift by one of the sub-pixels which has a larger area and one of the sub-pixels which has a smaller area is made on the basis of a second pixel row; or except for a first pixel row, the arranging order of the sub-pixels of each elementary pixel of each pixel row is that, a left shift by one of the sub-pixels which has a larger area and one of the sub-pixels which has a smaller area is made on the basis of a previous row, and the arranging order of the sub-pixel of each elementary pixel of the first pixel row is that, a right shift by one of the sub-pixel which has a larger area and one of the sub-pixel which has a smaller area is made on the basis of a second pixel row.

2. The color filter substrate according to claim 1, wherein another sub-pixel in at least one of the colors has a number of 1.

3. The color filter substrate according to claim 1, wherein the first-color sub-pixel, one second-color sub-pixel, one third-color sub-pixel have the same area.

4. The color filter substrate according to claim 1, wherein the sub-pixels of each of the elementary pixels are arranged in a line.

5. The color filter substrate according to claim 1, wherein the number of the fourth-color sub-pixels is three, and the area of each of the fourth-color sub-pixels is equal to one third of the area of each of the sub-pixels in other colors.

6. The color filter substrate according to claim 1, wherein the sub-pixels in four colors comprise sub-pixels in three primary colors of R, G, and B and a sub-pixel in other color.

7. The color filter substrate according to claim 6, wherein the sub-pixel in other color is a yellow sub-pixel.

8. The color filter substrate according to claim 6, wherein the sub-pixel in other color is a yellow sub-pixel.

9. The color filter substrate according to claim 1, wherein the fourth-color sub-pixels are yellow sub-pixels.

10. The color filter substrate according to claim 1, wherein the fourth-color sub-pixels are yellow sub-pixels.

11. A liquid crystal panel, wherein the liquid crystal panel comprises the color filter substrate according to claim 1.

12. A color filter substrate comprising a plurality of elementary pixels, wherein each of the elementary pixels comprises sub-pixels in four colors;

among the sub-pixels in four colors, a sub-pixel in at least one of the colors has a number larger than or equal to 2; and in each pixel row, the elementary pixel, which is composed of the first color sub-pixel, one of the fourth-color sub-pixels, the second-color sub-pixel, one of the fourth-color sub-pixels and the third-color sub-pixel, is periodically arranged.

13. The color filter substrate according to claim 12, wherein another sub-pixel in at least one of the colors has a number of 1.

14. The color filter substrate according to claim 12, wherein the first-color sub-pixel, the second-color sub-pixel and the third-color sub-pixel have the same area.

15. The color filter substrate according to claim 12, wherein the sub-pixel of each of the elementary pixels are arranged in a line.

16. The color filter substrate according to claim 12, wherein the number of the fourth-color sub-pixels is two, and the area of each of the fourth-color sub-pixels is equal to half of the area of each of the sub-pixels in other colors.

17. The color filter substrate according to claim 12, wherein the sub-pixels in four colors comprise sub-pixels in three primary colors of R, G, and B and a sub-pixel in other color.

18. The color filter substrate according to claim 17, wherein the sub-pixel in other color is a yellow sub-pixel, a pink sub-pixel or a cyan sub-pixel.

19. The color filter substrate according to claim 17, wherein the sub-pixel in other color is a yellow sub-pixel.

20. The color filter substrate according to claim 12, wherein the fourth-color sub-pixel are green sub-pixel.

* * * * *